(12) United States Patent
Cooper

(10) Patent No.: US 7,574,896 B1
(45) Date of Patent: *Aug. 18, 2009

(54) LEAK DETECTION AND CONTROL

(75) Inventor: Ralph W. Cooper, Sanford, MI (US)

(73) Assignee: Michigan Aqua Tech, Inc., Sanford, MI (US)

( * ) Notice: Subject to any disclaimer, the term of this patent is extended or adjusted under 35 U.S.C. 154(b) by 191 days.

This patent is subject to a terminal disclaimer.

(21) Appl. No.: 11/604,636

(22) Filed: Nov. 27, 2006

Related U.S. Application Data

(63) Continuation-in-part of application No. 10/665,921, filed on Sep. 18, 2003, now Pat. No. 7,174,771.

(51) Int. Cl.
*G01M 3/28* (2006.01)

(52) U.S. Cl. .................................. 73/40.5 R

(58) Field of Classification Search .............. 73/40, 73/40.5 R; 137/15.11; 340/605; 702/51
See application file for complete search history.

(56) References Cited

U.S. PATENT DOCUMENTS

| | | | | |
|---|---|---|---|---|
| 2,659,383 | A * | 11/1953 | Frager | 137/460 |
| 4,522,229 | A * | 6/1985 | Van de Moortele | 137/460 |
| 4,586,142 | A * | 4/1986 | Cota et al. | 702/51 |
| 4,655,932 | A | 4/1987 | Quenin | |
| 4,665,932 | A * | 5/1987 | Quenin | 137/486 |
| 5,076,321 | A * | 12/1991 | Terry | 137/460 |
| 5,161,563 | A * | 11/1992 | Thompson | 137/1 |
| 5,179,922 | A * | 1/1993 | Bartholomew | 123/198 DB |
| 5,347,264 | A * | 9/1994 | Bjorkman | 340/611 |
| 5,441,070 | A | 8/1995 | Thompson | |
| 5,539,384 | A | 7/1996 | Fraser | |
| 5,636,653 | A * | 6/1997 | Titus | 137/14 |
| 5,920,265 | A * | 7/1999 | Johnson et al. | 340/605 |
| 6,317,051 | B1 * | 11/2001 | Cohen | 340/603 |
| 6,339,953 | B1 | 1/2002 | Ashworth | |
| 6,549,857 | B2 * | 4/2003 | Fierro et al. | 702/51 |
| 7,174,771 | B2 | 2/2007 | Cooper | 73/40.5 R |
| 2005/0072214 | A1 | 4/2005 | Cooper | |

OTHER PUBLICATIONS

U.S. Appl. No. 10/665,921, Cooper.
Aqua Managers, Inc., FloodStop (FS 3/8-C) unit info., Home/Product page (www.aquamanagers.com) downloaded Nov. 27, 2006.
Davis inotek(R) Instruments, PSR Series Paddle Type Flow Switch info., copyright 2004, downloaded sub-sequently (Davis.com).

(Continued)

*Primary Examiner*—John Fitzgerald
(74) *Attorney, Agent, or Firm*—Christopher John Rudy

(57) ABSTRACT

Fluid leaks can be detected and controlled in a pressurized piping system. Apparatus for this includes control logic; in communication with the logic, a flow detector and/or a pressure detector, and a control valve. One or more of the following is or are provided also: the flow and pressure detectors are both present, and both as single units; the control logic, the flow and/or pressure detector(s) and the control valve are in close proximity to one another; and the control valve has a baseline condition of being shut off. A remote control device can remotely interact with the control logic. Pressure decay and/or flow properties can be employed. The fluid can be water as, for example, in a residential, commercial or institutional system.

21 Claims, 10 Drawing Sheets

OTHER PUBLICATIONS

FloLogic, Inc., The FloLogic Automatic Water Shutoff System unit info., Home page (www.flologic.com). downloaded Nov. 27, 2006 (copyright 2006),.. with FloLogic System 3.0 Printable Spec sheet.

Give Systems, Inc., Aqua-Stop? water leak detection system, executive summary downloaded (www.building.org) Nov. 27, 2006.

H2Control, Mitigatoor water control system, product info., home page . . . (www.themitigator.com) with "about" info., downloaded Nov. 27, 2006.

DynaQuip Controls, WaterCop automatic water shut-off systems, home page, product overview (how does it work? and where do I place sensors?), and FAQs (www.watercop.com) downloaded Nov. 27, 2006 copyright 2006).

* cited by examiner

LEAK DETECTION AND CONTROL

This is a continuation-in-part of U.S. patent application Ser. No. 10/665,921 filed on Sep. 18, 2003 A.D., which published as Pub. No. US 2005/0072214 A1 on Apr. 7, 2005 A.D., and which issued as U.S. Pat. No. 7,174,771 B2 on Feb. 13, 2007 A.D. The entire specifications to include drawings of that regular utility patent application and that patent application publication are incorporated herein by reference.

FIELD AND PURVIEW OF THE INVENTION

In general, the present invention concerns detection and control of leaks in pressurized liquid piping systems, with apparatus and method of its employment. More particularly, the invention concerns a leak detection apparatus and method, in which pressure decay and/or flow properties can be employed to ascertain whether or not a leak is present, and, preferably, to control flow of the liquid. In particular embodiments, devices for measuring pressure decay and flow properties are singular in number and/or are contained within a relatively small space, for example, in a housing, which may contain electronic controls; and more preferably, the baseline condition for monitoring and/or controlling the piping system is that of being shut off. Water is a liquid for which such piping systems often are designed.

BACKGROUND TO THE INVENTION

Leaking pipes can be a devastating problem. For example, leaks from water pipes in residential, commercial or institutional type buildings can cause water damage, which is cosmetic or structural in nature; electric failures and fires; and, in freezing weather, ice build up, which can cause structural failure. A particularly worrisome condition, especially in those structures in which some sort of leak control system is installed, is that in which an electrical supply failure and leaking pipes occur simultaneously. Then, too, leaking water pipes cause unnecessarily high bills.

Various prior art discloses devices and methods for detecting leaks in piping systems, and then automatically shutting off the supply to the piping system in order to minimize damage and waste that can be caused by a leak, and so forth. See, e.g., Thompson, U.S. Pat. No. 5,441,070. See also, U.S. Pat. Nos. 2,659,383 to Frager; 4,522,229 to Guido; 4,665,932 to Quenin; 5,076,321 to Terry; 5,161,563 to Thompson; 5,347,264 to Bjorkman; 5,539,384 to to Fraser; 5,636,653 to Titus; 5,920,265 Johnson, Jr., et al.; 6,317,051 to Cohen; 6,339,953 to Ashworth; and 6,549,857 to Fierro et al. Prior art approaches generally were insufficiently reliable, unable to discriminate between controlled and uncontrolled pressure drop at very low flow rates, or too complex or expensive to be effectively utilized in many applications.

It would be desirable to ameliorate if not solve completely problems in the art. It would be desirable as well to improve upon the disclosures and approaches of the prior art.

SUMMARY OF THE INVENTION

The present invention provides, in one aspect, a leak detection apparatus for detecting and controlling a leak in a pressurized piping system, which comprises control logic; at least one of a flow detector in communication with said logic, and a pressure detector in communication with said logic; and a control valve in communication with said logic—wherein at least one of the following features is also provided: the flow detector and the pressure detector are both present, with the flow detector present as a single unit, and the pressure detector present as a single unit; the control logic, the at least one of a flow detector and a pressure detector, and the control valve are in close proximity to one another; and the control valve has a baseline condition of being shut off. The apparatus can be construed to be by itself and suitable for application with, or to be otherwise a part of, a system for detecting a leak in a pressurized piping system, especially one having a main fluid supply line and a plurality of branch fluid supply lines in communication with the main fluid supply line. Provided also, in another aspect, is a method for detecting a leak in a pressurized piping system, which beneficially has the main fluid supply line and plurality of branch fluid supply lines in communication with the main line, which can comprise operation of an apparatus or system of the invention, but which, in general, employs pressure decay and/or flow properties to ascertain whether or not a leak is present, and, preferably also to control a leak that has been detected hereby.

The invention is useful in leak detection and control.

Significantly, by the invention, the art is advanced in kind. In more commonly and broadly encountered situations, residential, commercial and institutional water lines can be protected against leakage automatically and with great efficiency with embodiments of the invention. The invention avoids complexities and uncertainties of known devices, and is highly reliable. It can generally discriminate between controlled and uncontrolled pressure decay at very low flow rates, i.e., those below detection by a flow switch, the former represented, for example, by replenishment in a refrigerator's ice-maker, the latter, an unwanted leak. It is cost-efficient to manufacture, install, and operate. Also, the three-valve manifold allows easy service and by-pass in the event water is desired for delivery during a power failure. In addition, a remote control device allows for remote reset and override capability, among other things, and the remote control device allows for a leak test on demand at any time, from a remote or proximate location, to insure proper operation.

Numerous further advantages attend the invention.

DRAWINGS OF SOME INVENTION EMBODIMENTS

The drawings form part of the specification hereof. With respect to the drawings, which are not necessarily drawn to scale, the following is briefly noted:

ILLUSTRATIVE EMBODIMENTS OF THE INVENTION

Figure 1:
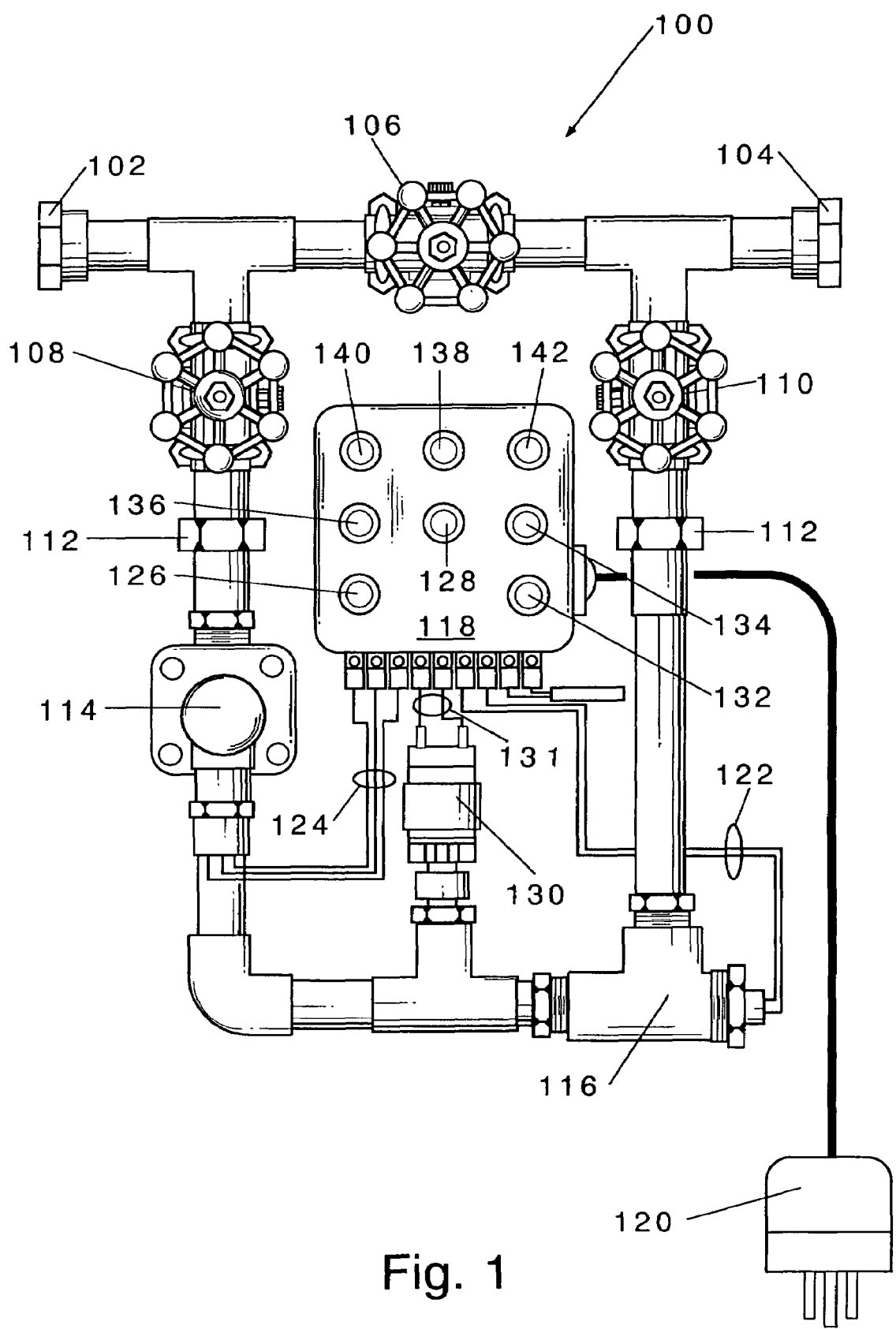
FIG. 1 shows an embodiment of a leak detection apparatus or system of the invention. Note, the parent application.

The invention can be further understood by the detail set out below, which may be read in view of the drawings. Such is to be taken in an illustrative and not necessarily limiting sense.

The invention provides leak detection with control of the leak in a pressurized piping system. The piping system generally contains or is designed to contain a fluid, typically a liquid, which is noncompressible or nearly so, for example, water. Other fluids, however, can be of concern, especially substantially or essentially noncompressible liquids. The piping system can be simple, or it can be brachiated, i.e., having a main fluid supply line and plurality of branch fluid supply lines in communication with the main line. Thus, residential, commercial, institutional and industrial water lines, and other fluid lines to include liquid antifreeze piping systems, liquid chemical piping systems in a manufacturing or delivery setting, and so forth, can be of concern. In general, the invention can employ pressure decay and/or flow properties to ascertain whether or not a leak is present, and valve control to address a leak found to be present.

The apparatus of the invention includes control logic. Any suitable configuration for the control logic can be employed. This may include employment of a mechanical, electro-mechanical, or electronic circuit device, and combination of such devices. Preferably, the control logic includes electronic circuitry. In communication with the control logic are included at least one of a flow detector and a pressure detector; and a control valve. Advantageously, the control logic may be programmed, monitored, and/or controlled by a remotely positioned unit, for example, a hand-held, portable, remote control unit in radio communication with the control logic.

The flow detector can detect flow, typically to a fine degree, for example, as little as 0.2 gallons per minute (gpm) flow of water or less in a residential water piping system. The flow detector can be of any suitable configuration, to include a flow switch or a flow meter, which are well known in the art. Preferably the flow detector is a piston/by-pass type flow meter. The flow detector can be considered to be a user demand detector.

The pressure detector can detect loss of pressure in a piping system that has pressurized fluid inside, generally by decay of pressure, typically to a fine degree, for example, about from fifty to two pounds per square inch gauge (psig) per minute in a residential water piping system. A low threshold pressure, say, a 15-psig pressure or below in a residential water piping system that normally operates under a 55-psig to 100-psig pressure, may be a property that is detected to indicate loss of pressure.

Any suitable communication between the user demand and pressure detectors and the control logic can be employed. Mechanical, electrical and radio communication may be employed. Advantageously, electrical communication is employed.

Beneficially both flow and pressure detectors are present.

Also, the apparatus has one or more of (1) the flow detector and the pressure detector being both present, with each of the flow and pressure detectors present as a single unit; (2) the control logic, the at least one of a flow detector and a pressure detector, and the control valve being in close proximity to one another; and (3) the control valve having a baseline condition of being shut off. As to the first feature, this has advantages of providing simplicity and efficiency while still being highly effective in detecting and controlling leaks, even in a brachiated system. As to the second feature, this consolidation has advantages of simplicity, economy, ease of installation and operation, and neatness, and such consolidation can be effected by providing a relatively small housing and mounting the components inside. As to the third feature, this has advantages of security, especially in situations where there is an electrical power supply outage, and efficiency.

Numerous other features can be provided.

Figure 2:
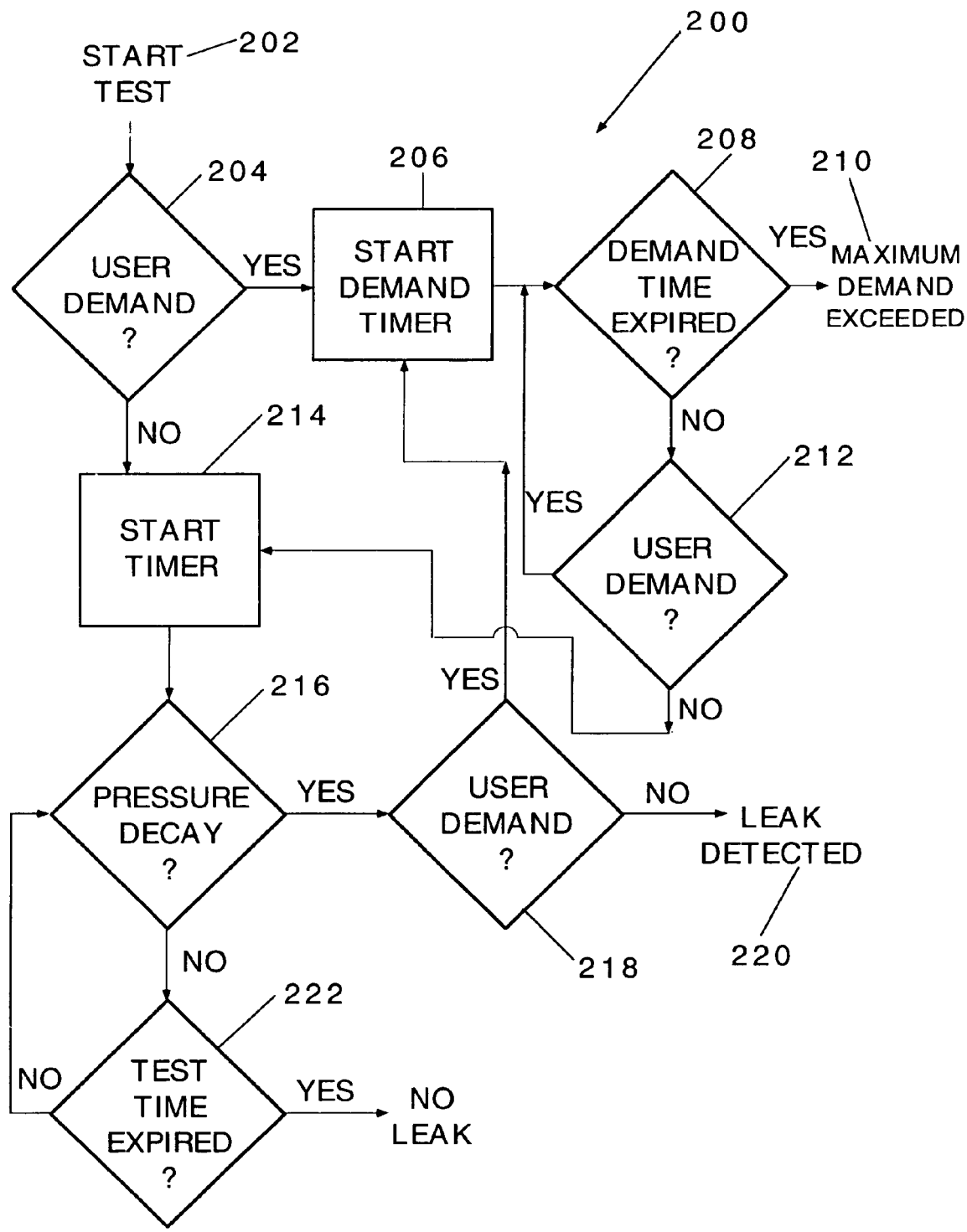
FIG. 2 shows a flow chart that illustrates an example of a method of the invention. Note, the parent application.

With respect to the drawings, FIGS. 1 and 2 depict exemplary embodiments of the invention, which may be considered to be those such as initially set forth in the parent. Such a disclosure can be read, furthermore, in light of and be applied to the present continuing disclosure. FIGS. 3-8 depict further exemplary embodiments of and disclosure for the invention, and such matter can be read in light of and be applied not only to the present continuing disclosure but also to the disclosure from the parent.

Thus, the embodiments of FIGS. 1 and 2 can be made and used as set forth in the parent, and they can include leak detection system 100 of FIG. 1, which advantageously may be installed in a residence to detect and limit damage from leaks from the water piping system of the residence, which may be brachiated. And so, the system 100 can include the following enumerated features:

| Number | Comment |
|--------|---------|
| 102 | First piping joint, attaches to main water supply. |
| 104 | Second piping joint, attaches to residence piping. |
| 106 | First manual valve between joints 102, 104, normally closed in operation; can be opened for by-pass mode, for instance, to facilitate maintenance or repairs, where water flows through the joint 102, through the valve 106, and then out the joint 104 only. |
| 108 | Second manual valve, on a test line connected to the first joint 102, normally open during operation, but can be closed for by-pass mode such as for service. |
| 110 | Third manual valve, on the test line connected to the second joint 104, normally open during operation, but can be closed for by-pass mode such as for service. |
| 112 | Disconnect unions, on the test line and distal to the valves 108, 110, which, for example, in by-pass mode, can be loosened to release the bottom portion of the system 100 for maintenance, repair, or replacement. |
| 114 | Shutoff valve, may be in a baseline open or closed configuration, through which water can flow from the valve 108 to the valve 110 during normal operation. |
| 116 | User demand detector, for example, a flow switch, can be preset to detect minimal water flow, say, 0.2 gpm; and through which water can flow from the valve 108 and valve 110 when open to the valve 110 normally. |
| 118 | Control box, contains control logic. |
| 120 | Electrical power supply cord, communicates power to run the system 100, for example, by plugging into a standard 120-V AC electrical outlet. |
| 122 | Electrical wires between the detector 116 and control logic of control box 118, communicate user demand, for instance, for timing by the control logic, which logic, for example, in a baseline open system can cause closure of the valve 114 if the period of user demand exceeds a set maximum time period, stopping water flow in the piping system with which the system 100 is mounted; or which logic, for example, can initiate and control a leakage test, and so forth. |
| 124 | Electrical wires between the shut-off valve 114 and control logic of the box 118, carry signals from the control logic to close or open the valve 114. |
| 126 | User demand set dial, can be set, for example, from a 1-minute to a 99-minute setting, to establish a maximum user demand time period. |

-continued

| Number | Comment |
| --- | --- |
| 128 | Fault indicator light, for example, a light-emitting diode (LED), can be illuminated through signals from the control logic whenever the maximum user demand time period is exceeded to indicate why the system 100 is shut down. |
| 130 | Pressure detector, for example, a pressure switch, in electrical communication with control logic in the box 118 through a set of wires between the detector 130 and the control logic, can be monitored in a pressure decay test initiated by the control logic, for example, every few hours or minutes and under conditions of no user demand as checked through the detector 116. |
| 131 | Electrical wires between the pressure detector 130 and control logic of the box 118, carry signals to communicate pressure condition. |
| 132 | Pressure decay test time dial, can be preset, for example, from a 1-second to a 99-second interval, to establish duration of the pressure decay test period. |
| 134 | Leak-detected indicator light, for example, an LED, lights up when the system 100 has detected a leak and accordingly has shut down. |
| 136 | System reset button, can be pressed to restart the system 100 after shut down, which, for example, in a baseline open configuration opens the valve 114, etc. |
| 138 | Power-on indicator light, for example, an LED, lights lights up when power is supplied to the system 100 as by way of the cord 120. |
| 140 | Demand-testing indicator light, for example, an LED, lights up when a user demand test is being performed. |
| 142 | Leak-testing indicator light, for example, an LED, lights up during performance of pressure-decay tests. |

In the system 100 with the baseline open shut-off valve 114 configuration, the flow switch 116 is employed to determine whether user demand is present. The switch 116 can be set to any suitable flow rate, for example, the 0.2-gpm flow rate noted above. Whenever there is user demand, the control logic keeps track of the how long that demand is present. If the period of user demand exceeds a predetermined maximum user demand time, for example, as set by the dial 126, the control logic communicates a signal to the normally open shut-off valve 114 to close, stopping water flow through the system 100 as well as the piping system with which it is mounted. Also in that system 100, the control logic initiates leakage tests according to a preset leakage test frequency, for example, every few hours in a residential setting, by first checking the detector 116 for flow, and, if there is flow detected, the test is delayed until there is no user demand detected. If no user demand is detected, the leakage test is begun. The control logic causes closure of the shut-off valve 114, stopping water flow into the system 100 and the residential water piping, and the logic then begins to monitor the pressure detector 130 for its predetermined time, i.e., for the pressure decay test time, for example, for a 30-second period in the residential setting as set by the dial 132. The detector 130 detects if the pressure in the piping system drops below a predetermined acceptable pressure, for example, a 15-psig value in the residential setting. If the pressure has dropped below the acceptable pressure, then the control logic initiates a test to determine if there is user demand such as caused by a user turning on a faucet that commenced after the beginning of the pressure decay test and before ascertaining whether or not the minimum acceptable pressure has been breached. The control logic performs this test for user demand by first opening the shut-off valve 114, which had been closed for the pressure decay test, and then checking the flow detector 116 to determine if the minimum user flow rate has been reached.

In some applications, fluctuations in flow rate may exist for a brief period after reopening of the valve 114. The control logic may account for these fluctuations by delaying for a short time, for example, about half a second, before checking the flow detector 116 for user demand, or the control logic may check that the detector 116 has detected a minimal user flow rate continuously for a short period, for example about half a second, before determining that user demand is present. If the test for user demand performed during a leakage test shows that no user demand is present, then there is a leak in the piping system, and the control logic sends a signal to the shut-off valve 114 to close, stopping water flow through the system 100 and hence the piping system with which it is mounted. On the other hand, if the test for user demand performed during a leakage test shows that indeed there is user demand present, the control logic keeps the valve 114 open and waits until no user demand is detected, at which time the leakage test is restarted.

The exemplary leak detection method 200 of FIG. 2 can include the following enumerated features and steps:

| Number | Comment |
| --- | --- |
| 202 | Leakage test, employs frequency timing, for example, with a timer, to determine when to start a test 202. |
| 204 | Determination of the presence of user demand. |
| 206 | Demand timing, for example, with a timer, starts when user demand 204 is detected, and keeps track of how long user demand is present. |
| 208 | Maximum user demand time, compared to current user demand as timed by the demand timing 206. |
| 210 | Exceeding of maximum demand, can shut down system as by closing a shut-off valve if time 208 exceeded. |
| 212 | Determining if user demand present, carried out if the time 208 is not exceeded. |
| 214 | Leakage test timing, for example with a timer, started if no user demand; if user demand is present, determine whether the maximum demand time 208 has been exceeded and whether user demand 212 is present until either maximum demand is exceeded 210 or there is no longer user demand. |
| 216 | Pressure decay test, timing, for example, with a timer, started when no user demand is present or detected user demand stopped, and detector checks for pressure drop or decay in the piping system. |
| 218 | User demand check if pressure decay detected. |
| 220 | Leak detected if no user demand 218 present; if user demand detected the test 216 is halted, user demand timing 206 is started, and the method proceeds as above until either no user demand is present or the maximum user demand time has is exceeded 210. |
| 222 | Expiration of decay test time, checked if no pressure decay is detected; if the time 222 has expired, then the pressure decay test is complete, and no leak has been found; if the pressure decay test time 222 has not expired, then checking for pressure decay 216 is continued, and checking to determine if the test time 222 has expired continues until either pressure decay has been detected or the test time 222 has expired. |

Further, embodiments as depicted in FIGS. 3-8 are provided.

Figure 3:
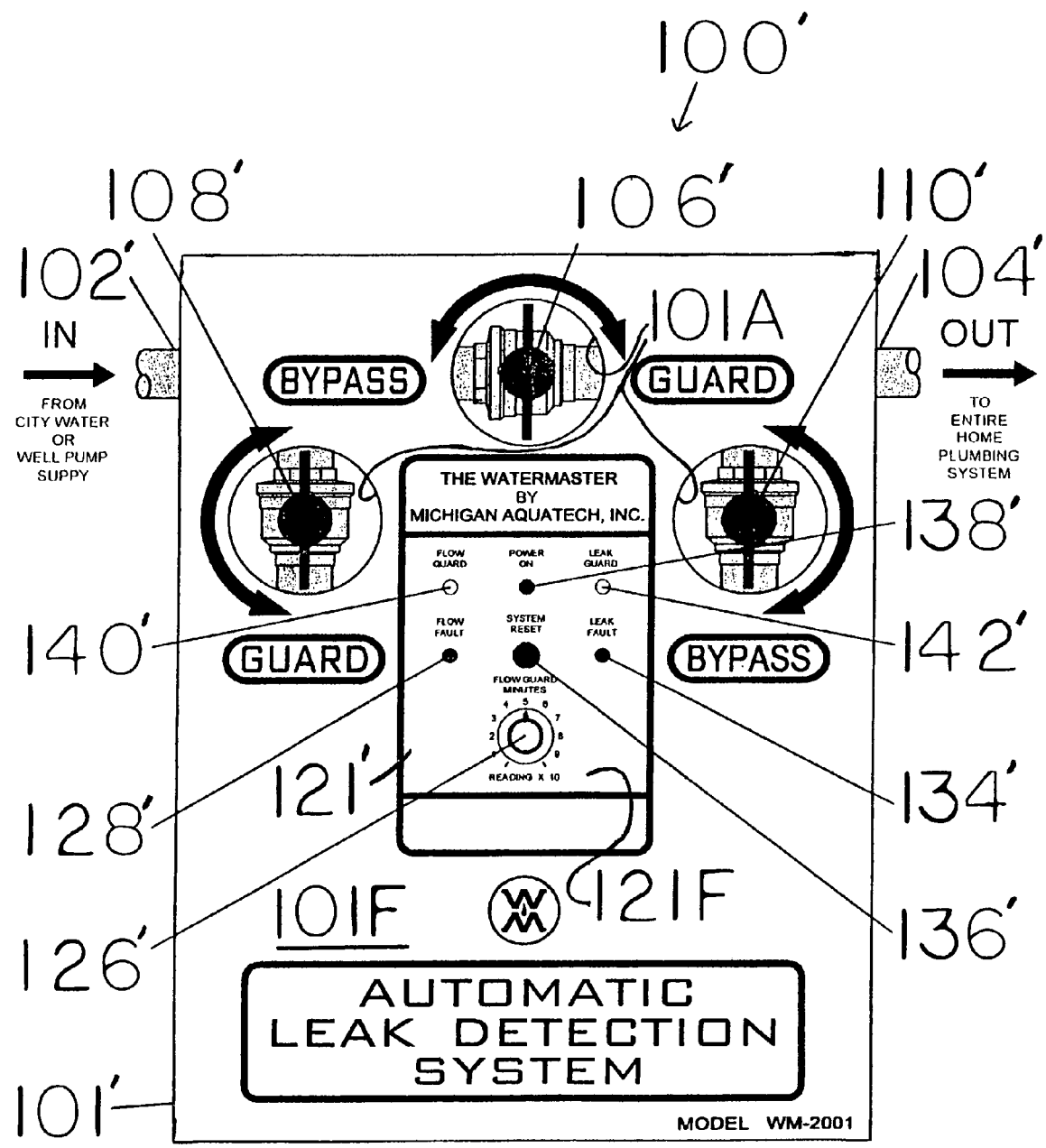
FIG. 3 shows a front view of another embodiment hereof.
Figure 4:
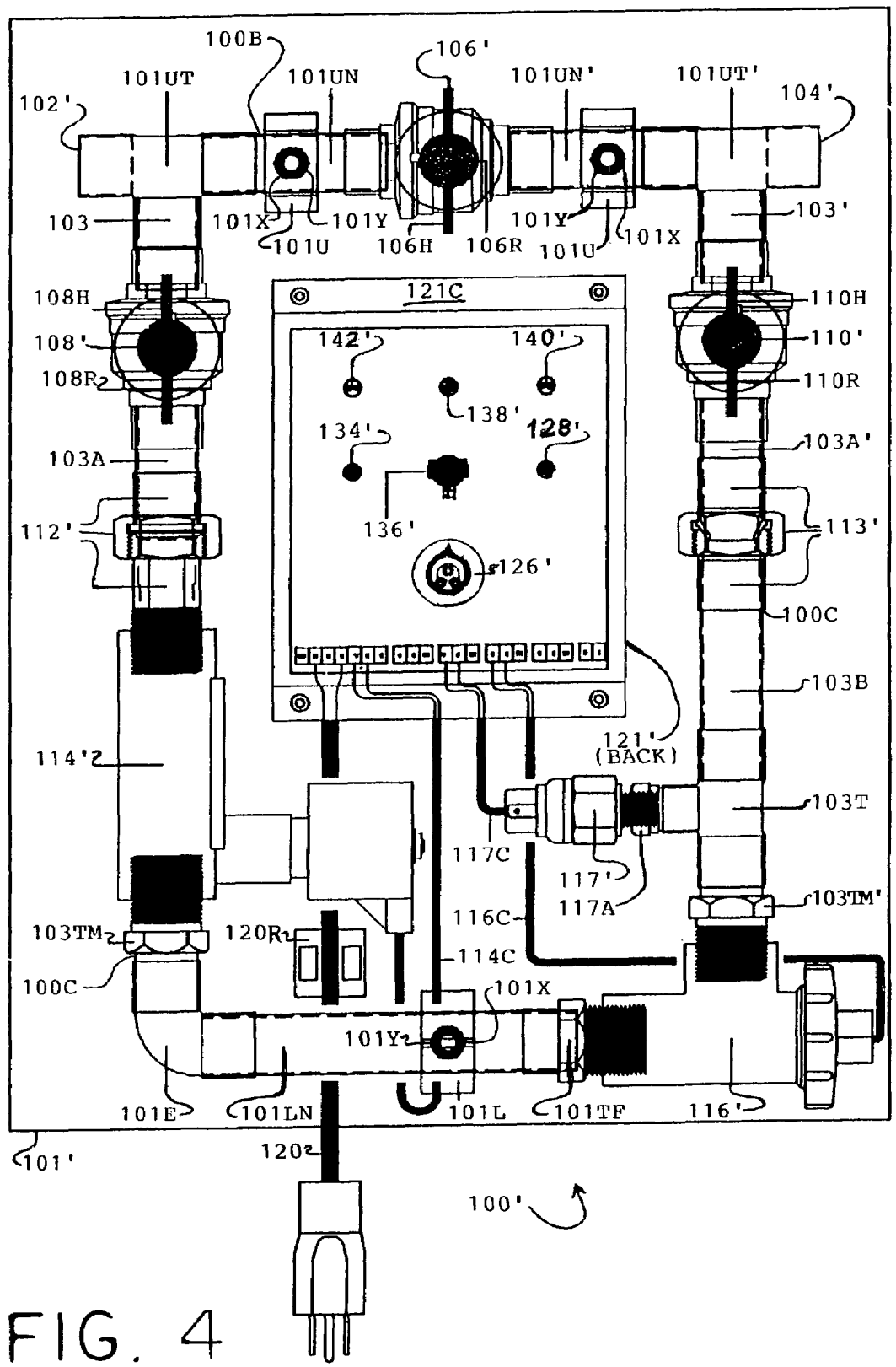
FIG. 4 shows a plan view of the embodiment of FIG. 3, with its front cover removed.
Figure 5:
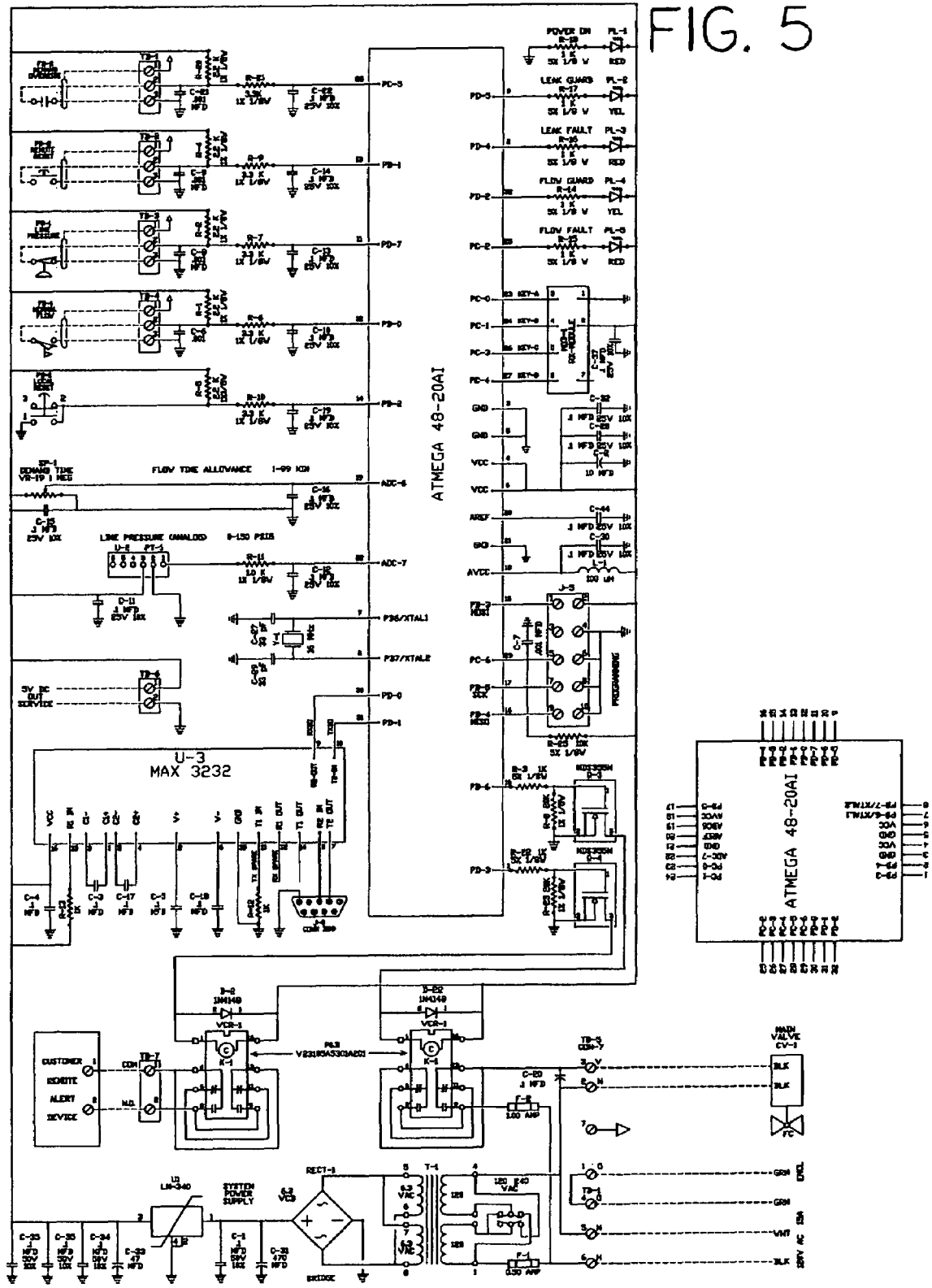
FIG. 5 shows a circuit diagram for control logic in a control panel within the embodiment of FIGS. 3 and 4.

Such embodiments can include apparatus 100' of FIGS. 3-5. The apparatus 100', which has fluid by-pass line 100B and fluid test circuit 100C, can include main enclosure (housing) 101' made of any suitable material, for example, aluminum or stainless steel sheet metal, and can be of a relatively small size, for example, about a 16-inch height by a 12-inch width by a 4-inch or so depth. The housing 101' can have access openings 101A, for example, in its front face 101F, say, for access or visibility to valves and/or a control panel. The face 101F may have indicia thereon such as provided by silk-screening, engraving, and so forth. To the inside of the housing 101' can be mounted a number of retaining fasteners such as lower secure retaining clip 101L and two upper spring retaining clips 101U, each of which have employ threaded retaining clip stand off 101X and retaining clip lock nut 101Y to fasten other components of the apparatus 100' such as piping, for example, the lower clip 101L holding onto a ¾-inch diameter by 5⁵⁄₁₆-inch length copper tube nipple 101LN, which is attached on its water-entry end to a ¾-inch diameter copper tube elbow 101E and on its water-exit end to a ¾-inch National pipe thread male (NPTM) threaded tube adapter 101TF made of iron, steel, aluminum, copper, plastic, ceramic or the like; one upper clip 101U holding onto a ¾-inch diameter by 2⅝-inch length copper tube nipple 101UN, which is attached to a ¾-inch diameter copper tube tee 101UT, which embraces first piping joint 102' that attaches to main water supply and into which water can flow; the other upper clip 101U holding onto another ¾-inch diameter by 2⅝-inch length copper tube nipple 101UN', which is attached to another ¾-inch diameter copper tube tee 101UT', which embraces second piping joint 104' that attaches and can deliver water to the residence piping system. Other pipe conduit sections can include two ¾-inch diameter by 1⅜-inch copper tube nipples 103, 103'; two ¾-inch diameter by 1⅝-inch length copper tube nipples 103A, 103A'; a ¾-inch diameter by 3¼-inch length copper tube nipple 103B; a ¾-inch through diameter to ½-inch side diameter copper reducing tee 103T; and two ¾-inch NPTM by ¾-inch male threaded tube adapters 103TM, 103TM' made of iron, steel, aluminum, copper, plastic, ceramic or the like. Advantageously, one or more manual control valves are employed, but these otherwise may be automatic or opened or closed with the assistance of motive power such as electromotive power, or otherwise may be eliminated although that is not desirable, and such valves may be first, second and third manual valves 106', 108', 110', each of which, for example, can be a ¾-inch diameter tube block and iso ball valve, which have handles 106H, 108H, 110H and retaining bolts 106R, 108R, 110R, respectively. As in the previous exemplary embodiment, the first manual valve 106' is mounted between the joints 102', 104' and is normally closed in operation; it can be opened for by-pass mode, for instance, to facilitate maintenance or repairs, where water flows through the joint 102', through the valve 106', and then out the valve 104' only. The second and third manual valves 108', 110' are mounted on test line sections connected to the first and second joints 102', 104', respectively; and these are normally open during operation, but can be closed for by-pass mode. Disconnect unions, 112' 113' are on the test line sections and distal to the valves 108', 110', respectively, which, as also in the previous exemplary embodiment, in by-pass mode can be loosened to release the lower portion of the system 100' for maintenance, repair, or replacement. The union 112' can be, for example, a ¾-inch diameter by ¾-inch diameter NPTM adapter union made of iron, steel, aluminum, copper, plastic, ceramic or the like; and the union 113' can be, for example, a ¾-inch diameter tube union made of iron, steel, aluminum, copper, plastic, ceramic or the like. Such components as well as others can be connected with further components and sections by soldering or threading, or in any other suitable manner, as appropriate.

The apparatus 100' also includes shut-off valve 114', for example, a Parker (Skinner Valve Div.) solenoid valve, model No. 7321BBN53NOONOL11P3-¾-inch orifice, 2-150 psig, 120-V AC, 60-Hz, Code 3004D, 10-watt valve. Although a shut-off valve, of which the valve 114' is representative, may be in a baseline open or closed configuration, it is preferably in the baseline closed position by which it normally resorts to the closed position to stop all water flow through the apparatus 100' unless the control logic directs otherwise, conveniently through electric communication wiring 114C, although radio or other manner of communication may be employed; in its open position, of course, water can flow from the valve 108' through the valve 114' to the valve 110' and out the second joint 104' to the piping and its branch lines, which the apparatus 100' can serve.

User demand detector 116', for example, an FS-1 GEMS FS-500/170231 flow switch, ¾-inch diameter National pipe thread female (NPTF) unit of polypropylene construction, set to about 0.25 gpm (T.H.) can detect minimal water flow. The detector 116' can be in communication with the control logic conveniently through electric wiring 116C, although radio of other manner of communication may be employed. Water can flow through the detector 116' from the valve 108' to the valve 110' and so forth.

Pressure detector 117' detects loss of pressure. It can be, for example, a GEMS 206056 pressure switch, 7-25 pounds per square inch G2 PS32-20-4MNB-B-SP-FX20PSIF SPST/NC spade, ¼-inch NPTM, factory set at a 20-psig falling value, which is connected to the water test line through adapter 117A, for example, a ½-inch diameter tube fitting to ¼-inch diameter NPTF adapter, and in communication with the control logic conveniently through electric wiring 117C, although radio of other manner of communication may be employed. Among other things, the detector 117' can be monitored in a pressure decay test initiated by the control logic, for example, every few hours and under conditions of no user demand as checked through the detector 116'.

Power for the apparatus 100' can be supplied through electrical power supply cord 120'. The cord 120', which can be secured to the housing 101' with power cord retainer 120R so that it does not get pulled away from the control box 118' so easily, communicates power, for example, by plugging it into a standard 120-V AC electrical outlet; or it may be permanently connected.

Control panel or box 121' can contain the control logic. Compare, FIG. 5 (solid state control wiring diagram). Cover 121C may be provided with the control box 121'. Various indicator light and control features can be provided on front face 121F of the control panel 121'. For instance, such features can be provided as follows:

| Number | Comment |
| --- | --- |
| 126' | User demand set dial, for example, an adjustable one million ohm potentiometer, is set for the maximum allowed time for continuous flow before the valve 114' returns to its closed baseline position, for example, set from an about 1-minute to 100-minute setting, to establish the maximum user demand time period. This may be considered a "flow guard knob." |
| 128' | Fault indicator light, for example, a light-emitting diode (LED) or other pilot light, such as of a red color, can be illuminated through signals from the control logic whenever a demand flow has exceeded the preset value or when a low rate count exceeds the set value to indicate why the apparatus 100' has stopped flow of water. It may be considered a "flow fault lamp." |
| 134' | Leak-detected indicator light, for example, an LED or other PL, such as the red light 128', lights up when a leak test has failed or when a low rate count exceeds the set value to indicate why the apparatus 100' has stopped flow of water. This may be considered a "leak fault lamp." |

-continued

| Number | Comment |
|---|---|
| 136' | Reset button, beneficially a Form C push button, can be pressed to restart the apparatus 100', say, after shut down. Consider this a "system reset button." |
| 138' | Power-on indicator light, for example, an LED or other PL such as the red lights 128', 134', lights up when the main control power is on. This may be considered a "power-on lamp." |
| 140' | Demand indicator light, for example, an LED or other PL such as a yellow control pilot light, lights up when water is flowing. This may be considered a "flow guard lamp." |
| 142' | Leak-testing indicator light, for example, an LED or other PL such as the yellow light 140', lights up while a leak test is being conducted. This may be considered a "leak guard lamp." |

Also, indicia may be provided on the front face 121F.

Accordingly, the features on the control panel face 121F of the control panel 121' of the apparatus 100' can differ from those found on the control panel 118 of the system 100. For example, a pressure decay test time dial such as the dial 132 in the system 100 may be absent; it may be provided elsewhere, or its function may be provided as a built-in, non-controllable or a programmable or communicatable function, say, by remote control.

Figure 6:
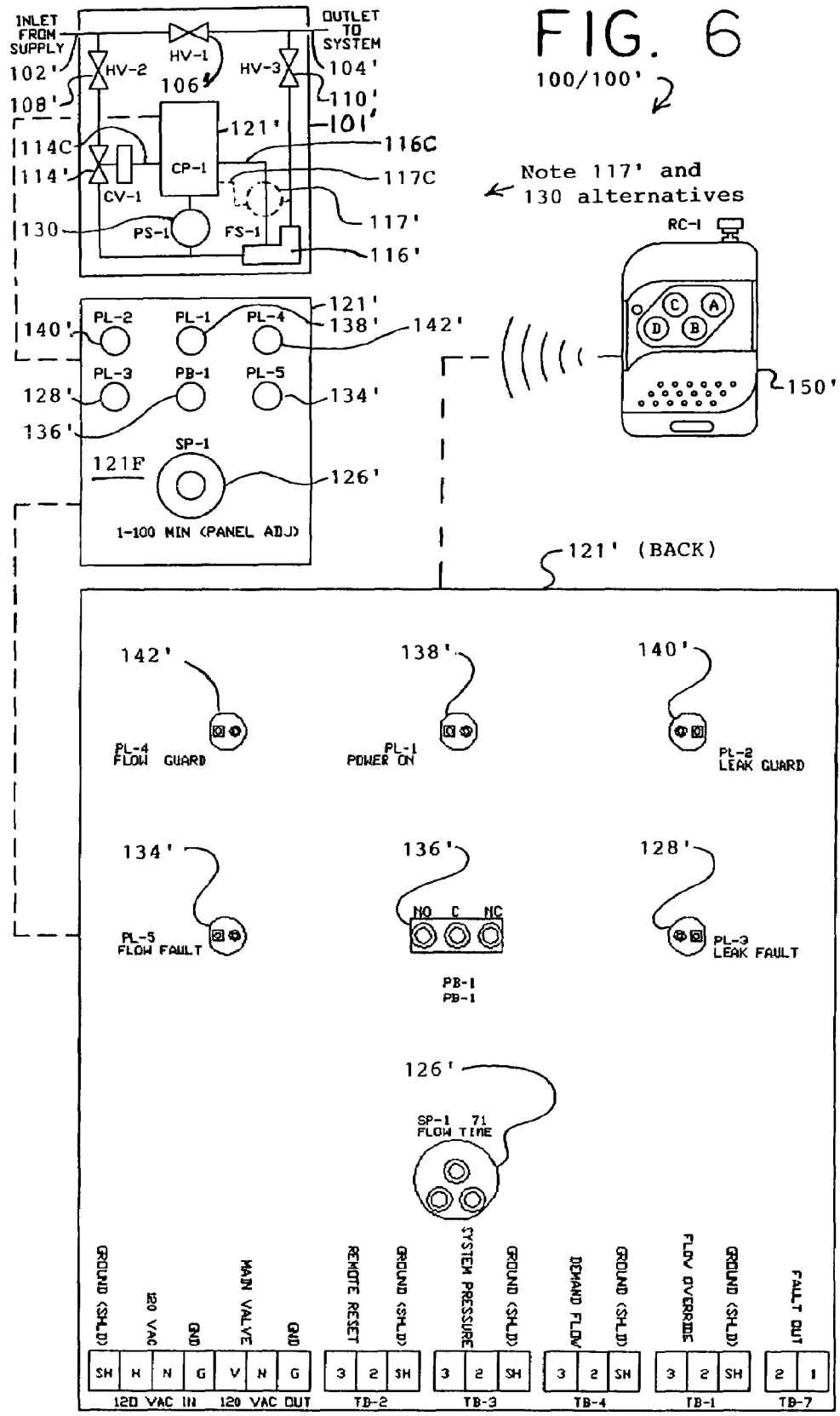
FIG. 6 shows a remote control device that can be employed in conjunction with apparatus of the invention, especially an embodiment such as that of FIGS. 3-5, with a plan of its interaction with that apparatus via its control panel (CP-1).

As shown in FIG. 6, the system or apparatus 100, 100', especially the apparatus 100', may be provided with remote control such as from a wireless unit, for example, hand-held, battery-powered radio-transmitter/receiver unit 150' (RC-1), and various functions may be provided with the unit 150'. Wireless control may otherwise or in addition to radio be provided by other electromagnetic radiation (EMR) such as infrared light, visible light, ultraviolet light or other EMR; sound or other physical vibration or impulse; and so forth. Radio communication may be amplitude modulated (AM), frequency modulated (FM), digital pulse modulated (DM), etc. FM is preferred. Push button switches, for example, "A," "B," "C," and "D," set to different frequencies, may provide for remotely activating these functions:

| Button | Comment | Button | Comment |
|---|---|---|---|
| "A" | System reset. | "C" | Vacation. |
| "B" | By-pass. | "D" | Access/exit program. |

Installation and start up of the system/apparatus 100, 100' can be simple and quick, especially when carried out by a licensed plumber. All soldered joints must have high integrity. The unit 100, 100' is beneficially installed in the main fluid supply line, for example, a solitary standard main water supply line at the point of entry into a building structure or other boundary delineating the remainder of the system. There should be no backfeed of fluid into the plumbing system beyond the unit 100, 100' by another supply. Advantageously, the unit 100, 100' is installed in systems having ¾-inch copper piping; otherwise, other fittings and/or adapters are provided. Installation, for example, of the apparatus 1001 can be carried out as follows:
1. The water supply is turned off at the main incoming valve. Water is drained from the piping system until all flow has stopped.
2. Installation generally requires 12½ inches in width and 16½ inches in height. A location is selected in which installation is in an upright position. If the existing piping arrangement is vertically oriented, the necessary fittings are installed to achieve the desired alignment. Use of the fewest fittings is recommended. Mounting can be on a wall such as with pipe hangers and stand-offs, or be installation can be directly in a horizontal pipe line.
3. Unions or flex fittings are not desired for installation.
4. Nine inches of the existing pipe is removed, or, if new lines have been installed, connections are prepared as required. The unit 100' is inserted into the piping, or new piping is set into place.
5. The manual valves 106', 108', 110' are opened. This can eliminate damage caused when solder joints are made.
6. The valve handles 106H, 108H, 110H are removed.
7. The housing 101' is gently pulled out and swung down, as it is attached at its lower end and will remain in place. Pressure clips 101U retain the position at the top. The inside components are protected, and solder joints are made, insuring that alignment is correct.
8. The housing 101' is placed back into position, and the valve handles 106H, 108H, 110H are replaced.

The unit 101' can now be tested for leaks and prepared for service. Start-up and testing of the apparatus 100', for example, can be carried out as follows:
1. Regarding piping and water supply system, the main water supply valve is slowly opened, and the plumbing system is allowed to fill. After several moments waiting all taps are then closed, starting from the nearest to the most distant. The objective is to remove as much air from the system as possible. Small amounts of air will be trapped but will be absorbed over time. The installation is inspected for leaks, and corrections are made as necessary. The by-pass valve 108' is closed, keeping the test line valves 106', 110' open. All handles 106H, 108H, 110H should be in the vertical position.
2. Regarding system power, the power cord 120' is plugged into a 120-V AC outlet. The red power-on lamp 138' lights up.
3. Regarding an initial flow check, the flow guard knob 126' is turned to the maximum position of "10," i.e., a 100-minute setting. Any tap in the water piping system is opened, and the flow is observed. Water should begin to flow as usual, then slow down slightly, and then go back to full flow. This verifies that the unit 100' is sensitive to a water demand request. The yellow flow guard lamp 140' should turn on within two seconds and remain on until the tap is closed. The selected tap is then turned off, and the lamp 140' should go out.
4. Regarding an excess flow check, the flow guard knob 126' is turned to its minimum position, i.e., a 1-minute value. A tap is opened. The flow guard lamp 140' should go on. The water is allowed to continue to run, and the time is observed. In about one minute, the water should shut off automatically by work of the apparatus 100'; the lamp 140' will go out, and the red flow fault lamp 128' will come on.
5. Regarding flow guard set up, the flow guard knob 126' is turned to the desired position. A 20-minute to 25-minute setting is usually plenty for typical applications. It is recommended that this setting be adjusted to the minimum time feasible, thus, among other beneficial things, conserving water resources.

Further technical data for the apparatus 100' can embrace the following:
1. User inputs associated with the control logic can include the following inputs controllable from the panel front 121F:
   system reset button 136' (PB-1); and
   flow guard knob 126', a variable resistor type with control in minutes (SP-1).

The wireless remote 150' (RC-1) also provides for user input.

2. User monitoring outputs located on the panel front 121F and associated with the control logic can include the following:

- power-on lamp 138' (PL-1);
- flow guard lamp 140' (PL-2);
- flow fault lamp 128' (PL-3);
- leak guard lamp 142' (PL-4); and
- leak fault lamp 134' (PL-5).

Also, user monitoring outputs may be located on the remote 150'.

3. Standard inputs with respect to terminal strip wiring associated with the control box 121' and control logic can include the following:

- for power, 120-V AC, from the cord 120' (TB-7), with black wire hot, neutral wire white, and green wire ground;
- for the flow switch 116' (TB-3) with normally open (N.O.) contact, which closes contact at approximately 0.21 gpm on increasing flow; and
- for the pressure switch 117' (TB-4) with normally closed (N.C.) contact (TB-4), which opens contacts at approximately a 30-psig value on increasing pressure.

4. Standard output with respect to terminal strip wiring associated with the control box 121' and control logic can include that to the shut-off control valve 114' (CV-1) (TB-6), 120-V AC 60-Hz, normally closed, full port.

5. Auxiliary inputs with respect to optional terminal strip wiring associated with the control box 121' and control logic may include the following:

- an external reset switch (TB-5), which allows the user to reset a fault condition from a hardwired switch away from the control panel, for example, in a kitchen, laundry room, bathroom, garage, by an outdoor faucet or water heater, and so forth, and which has normally open contact with multiple switches able to be wired in parallel; and
- a flow guard override switch (TB-2), which would indicate that a long-demand item needs water such as for a water-sprinkler system, a water softener, and so forth, N.O. contact input, usually from a relay or flow switch.

6. Auxiliary outputs with respect to optional terminal strip wiring associated with the control box 121' and control logic may include the following:

- fault lamp (TB-1), a security system link (N.O.), closed on fault, which requires power be supplied to the unit 100' for operation;
- power lamp (TB-8), 5-V DC, which is for service; and
- a ground for shielding.

7. Non-stored configuration settings with respect to terminal strip wiring associated with the control box 121' and control logic can include that from a flow guard timer (TM-3) set by the flow guard knob 126', which is the maximum continuous time that water can run, except when a flow guard override (TB-2) signal has been received. This is a user-adjustable factor, and about twenty minutes is recommended.

8. Stored configuration settings, electrically erasable permanent read only memory (EEPROM), with respect to terminal strip wiring, which may be optional, associated with the control box 121' and control logic, can include the following:

- a leak test cycle timer (TM-1), which times intervals between leak tests, set typically for twenty minutes, and which can be programmably adjustable, say, from the remote 150' to a 1-minute to 100-minute value;
- a leak test decay timer (TM-2), which times the duration of the leak test, set typically for five minutes, and which can be programmably adjustable, say, from the remote 150' to a 1-minute to 100-minute value;
- a flow guard override timer (TM-4), which is an auxiliary input that times the maximum duration water can run when the flow guard timer (TM-3) is being overridden (TM-2), set typically for two hours, and which can be programmably adjustable, say, from the remote 150' to a 1-hour to 10-hour value;
- a surge flow timer (TM-5), which times the minimum time allowed to establish a flow signal, i.e., the time allowed to establish a verified flow where a flow signal pulse from the flow switch 116' is expected when the piping system repressurizes and for which the flow switch 116' remains activated for the adjustable time period in order for a logical one-flow signal to be generated, set typically for two seconds, and which can be programmably adjustable, say, from the remote 150' to a 1-second to 10-second value;
- a surge window timer (TM-6), which controls the time allowed for flow verification, i.e., the maximum time allowed for verified flow signal to be established and begin the next programmable step, set typically for ten seconds, and which can be programmably adjustable, say, from the remote 150' to a 1-second to 10-second value;
- a low flow rate timer (TM-8), which determines possible low flow such as from drip-watering of plants or making ice in a freezer versus a leak, i.e., the time window at the beginning of a leak test when a low pressure condition is considered a "low flow" instead of a leak, set typically at three or eight seconds, and which can be programmably adjustable, say, from the remote 150' to a 1-second to 20-second value; and
- a configuration timer (TM-9), which is for limiting the time allotted to complete programming of the apparatus 100', say, through the remote control 150', although it can be beneficially factory preset to a default duration value, e.g., a 20-minute value.

9. Limits associated with the control logic can include the following:

- a leak failure limit (RG-1), which is the number of leak test failures that it takes for the apparatus 100' to go to a leak fault status indicated by the lamp 134' (PL-5), set typically to a default value of three, and which can be programmably adjustable, say, from the remote 150' to a 1-count to 10-count value; and
- a low flow failure limit (RG-2), which is the number of low flow failures that it takes for the apparatus 100' to go to a flow fault status indicated by the lamp 128' (PL-3), set typically to a default value of three, and which can be programmably adjustable, say, from the remote 150' to a 1-count to 10-count value.

10. Further features can be provided. For example, a last known state (normal, leak fault, flow fault, and so forth) hard program can be provided, which, for example, upon reset or restarting of the apparatus 100', returns the control logic to the last step at which it had been functioning previously. The state is updated in EEPROM when a fault occurs or is cleared.

Some internal variables that relate to Current State of the apparatus 100', for example, leak fault, flow fault, normal operation, and so forth, can include the following:

1. Leak failure count, which is the number of leak tests failed due to a possible leak, but not within the low flow leak time, since the last leak test had been passed, is the maximum number that the apparatus 100' is allowed to fail, and may be identified, "Leak Test Failures"; and 2. Low flow failure count, which is the number of leak tests failed within the low flow leak time since the last leak test had been passed, is the maximum number that the apparatus 100' is allowed to fail, and may be identified, "Low Flow Failures."

A sequence of operation with the apparatus 100' generally occurs as follows:

1. Power up, i.e. electrical power is supplied, and the apparatus 100' begins or continues its work. It includes the following indicators, conditions and contingencies:

Power On, which indicates that electrical power is being supplied, for which the red power-on lamp 138' (PL-1) lights;

Leak Guard Fault, for which the red leak fault lamp 134' (PL-5) lights;

Flow Guard Fault, for which the red flow fault lamp 128' (PL-3) lights; and

Low Flow Fault, for which the red lamps 128' (PL-3) and 134' (PL-5) light.

All values are set to the default values, which are for the timers (TM-1 through TM-9) to their configured values; for the leak failure count (RG-1) to a value of zero; and for the low failure count (RG-2) to a value of zero.

2. Start, i.e., the leak test timer (TM-1) is started to perform the initial or next leak test.

3. The control logic puts the unit 100' in Stand-by Mode.

With respect to stand-by mode, the following happens:

1. The unit 100' goes to re-pressure mode (and returns to this point from certain subsequent steps).
2. The water valve 114' is turned off, and the following occurs:
   if flow is detected while timing, go to Demand Flow Mode;
   if low pressure is detected, go to Re-pressure Mode;
   if the reset button 136' (or equivalent by remote) is pushed, go to Leak Test Mode; and
   when the leak test timer (TM-1) reaches its upper limit, go to Leak Test Mode.

With respect to the Re-pressure Mode, the following happens:

1. The water valve 114' is turned on (opened).
2. The surge window timer (TM-6) is started, and the following occurs:
   if flow starts, the surge timer (TM-5) is started;
   if flow continues until the surge timer (TM-5) expires, go to Demand Flow Mode;
   if demand override occurs through operation of the low flow rate timer (TM-8), go to Demand Override Mode; and
   when the surge window timer (TM-5) reaches its upper count, return to calling mode, i.e., Demand Flow Mode, Leak Test Mode or Stand-by Mode.

With respect to the Demand Flow Mode, the following happens:

1. The flow guard lamp 140' (PL-2) is turned on.
2. The shut-off control valve 114' (CV-2) is opened.
3. The demand time timer (TM-3) is started, and when flow is detected the demand time timer counts down demand time.
4. If any reset button 136' or equivalent by remote (PB-1, PB-A or wired remote reset PB-R) is activated, the demand timer (TM-3) will reset.

5. If the "B" button (PB-B) on the wireless remote 150' is activated, the following occurs:
   the water control valve 114' (CV-1) is kept open;
   a wait ensues until water stops flowing (FS-1); then
      the flow guard lamp 140' (PL-2) turns off;
      the leak test timer (TM-1) is restarted; and
      the unit 100' returns to Stand-by Mode.

With respect to the Demand Override Mode, the following happens:

1. When demand override input is detected, the valve 114' (CV-1) is opened.
2. The flow guard lamp 140' (PL-2) is turned on.
3. The override timer (TM-7) is started, and the following occurs:
   if any reset button (PB-1, PB-A, PB-R) is activated, the override timer (TM-7) will be reset;
   if the demand override input (TB-2) stays detected until the override timer (TM-7) expires, then the following occurs:
      the valve 114' (CV-1) is turned off;
      the red flow fault lamp 128' (PL-3) lights;
      the flow guard lamp 140' (PL-2) turns off;
      the Current State is set to Flow Fault; and
      the unit 100' waits for Reset input.
4. If the demand override input (TB-2) opens before the override timer (TM-7) expires, the following occurs:
   the flow guard lamp 140 (PL-2) turns off;
   the leak test timer (TM-1) starts; and
   the unit 100' returns to Stand-by Mode.

With respect to the Leak Test Mode, the following happens:

1. The unit 100' returns to the Re-pressure Mode, and the following occurs:
   the leak guard lamp 142' (PL-4) turns on; and
   the valve 114' (CV-1) is turned off, closing the water inlet and trapping the water under pressure in the pressurized piping system, noting further that pressure related to the actuated valve may be influenced by head pressure, and if the head pressure were to fall, the pressure after the valve will follow, but if the head pressure rises, the trapped pressure after the valve will stay the same.
2. The leak decay timer (TM-2) is started.
3. The low flow leak timer (TM-8) is started. If the leak decay timer (TM-2) expires and the pressure switch 117' (PS-1) never indicated low pressure in this time, then the following occurs:
   the valve 114' (CV-1) is turned on (opened);
   the leak guard lamp 142' (PL-4) is turned off;
   the leak failure count (RG-1) is set to zero;
   the leak test timer (TM-1) is reset; and
   the unit 100' returns to Stand-by Mode.
4. If there is a pressure drop, the unit 100' does the following:

turns on (opens) the valve 114" (CV-1);
if flow (FS-1) is indicated for longer than the surge time (TM-5) and within the surge window time (TM-6), then the following occurs:
   the leak guard lamp 142' (PL-4) turns off;
   the leak test timer (TM-1) is reset; and
   the unit 100' goes to Demand Flow Mode;
if flow is not indicated for longer than the surge time (TM-5) within the surge window time (TM-6), -continued

```
then the following occurs:
    if the low flow leak timer (TM-8) had expired
            when the pressure dropped, then the
            following occurs:
        the leak failure count (RG-1) is
            increased by one;
        if the leak failure count (RG-1)
            reaches its limit, then the
            following occurs:
            the valve 114' (CV-1) is
                turned off (closed);
            the red leak fault lamp 134'
                (PL-5) lights;
            the leak guard light 142'
                (PL-4) is turned off;
            the Current State is set to
                leak fault; and
            the unit 100' waits for
                Reset input;
        if the leak failure count (RG-1) has not
            reached its limit, then the following
            occurs:
            the leak guard lamp 142' (PL-4) is
                turned off;
            the leak test timer (TM-1) is reset;
                and
            the unit 100' goes to Stand-by Mode;
    if the low flow leak timer (TM-8) had not
            expired when the pressure dropped, then
        the low flow failure count (RG-2) is
        increased by one, and the following
        occurs:
        if the low flow failure count (RG-2)
            has reached the low flow failure
            limit, the following occurs:
            the valve 114' (CV-1) is
                turned off (closed);
            the red flow fault lamp 128'
                (PL-3) is turned on;
            the red leak fault lamp 134'
                (PL-5) is turned on;
            the leak guard lamp 142'
                (PL-4) is turned on;
            the Current State is set to
                flow fault; and
            the unit 100' waits for
                Reset input;
        if the low flow failure count (RG-2)
            has not reached the low flow
            failure limit, the following
            occurs:
            the leak guard lamp 142'
                (PL-4) is turned off;
            the leak test timer (TM-1)
                is reset; and
            the unit 100' goes into
                Stand-by Mode.
```

Further regarding the remote control unit 150' (RC-1) and its response with the apparatus 100', the following is noted:

1. Push button "A" (PB-A) is a system reset function. It elicits response by the panel control box (PCB) 121' of resetting the system, the same as pressing the reset button 136' on front panel 121F. If pushed while in the Stand-by Mode, the apparatus 100' will perform a leak test. A failure of one count in this operation will shut off the water through the valve 114' (CV-1).

2. Push button "B" (PB-B) is a by-pass function. It elicits response through the PCB 121' of a by-pass such that, if pressed while in the Demand Mode, i.e., water is flowing by user demand, the valve 114' (CV-1) is kept open for as long as water continues flowing, but as soon as the water stops flowing such as by shutting all taps any effects of pressing the button are canceled.

3. Push button "C" (PB-3) is a "vacation" function. It elicits the response through the PCB 121' of forcing the valve 114' (CV-1) to close until the apparatus 100' is reset; both the flow guard lamp 140' (PL-2) and the leak guard lamp 142' (PL-4) are turned on.

4. Push button "D" (PB-4) is an access/exit to programming function. It elicits a programming response through the PCB 121'. For example, if pressed three times within six seconds while in any mode except for Power Up or any of the Fault Modes, an operator can enter Configuration Mode in which programming of the apparatus 101' can be carried out. Pushing this button while in the Configuration Mode will exit the operation, and the unit 100' will go back to the Stand-by Mode.

With respect to the Configuration Mode, the following is noted:

1. Configuration Mode is entered by pressing the "D" button (PB-4) on the remote 150' three times within six seconds in any mode except Power Up or a Fault Mode. The valve 114' (CV-1) is opened and remains open for as long as the apparatus 100' remains in Configuration Mode. The 20-second configuration timer (TM-9) is started. If this time expires while in Configuration Mode, Configuration Mode is exited. While in the Configuration Mode, some of the lamps on the front panel 121F will be continuously blinking to indicate which configuration setting is being altered. Pressing the button "A" (PB-A) on the remote 150' advances to the next configuration option. Pressing the reset button such as the button 136' stores a new value into the currently selected configuration option, based on the current value of the front panel potentiometer, or in the case of the default options, stores default values into all user-configurable settings. Indicator lights that were blinking then light uninterruptedly for two seconds to indicate that a value has been stored for the selected function. The configuration mode can be exited by pressing the button "D" (PB-D) on the remote 150'. When Configuration Mode has been exited, Stand-by Mode is entered.

2. Programming with the remote 150' in Configuration Mode may be carried out in sight of the control face 121F.

3. Programming with the remote unit 150' can be carried out. The noted remote button descriptions are as follows:
    Button "A" (PB-A) activates reset and hence provides a manual leak test, and acts as a configuration stepper, i.e., it brings up the next function on which the user may operate and program;
    Button "B" (PB-B) activates the Demand Flow Override Mode;
    Button "C" (PB-C), the "vacation" button, shuts down flow through the valve 114' (CV-1) and lights up the flow and leak guard lamps 140', 142'; and
    Button "D" (PB-D) activates programming.

For programming the apparatus 100' initially, which is advantageously carried out at its manufacturing facility, the following steps can be carried out:
    Select microprocessor board as a panel control board (PCB), which will have hardware suitable for the control logic of the unit 100'; record its serial number in a test records file; connect power cord and insert PCB into a test stand accommodating it, and apply power to the PCB in the test stand.
    Load program; connect cable to interpreter and PCB.
    Select program icon on desk top, control program loads; then check, "CONFIG."

Connect cable directly to PCB serial port.

Select "CONFIG" icon on desk top, from which a window for configuration appears; select, "COM PORT 4"; press CONNECT; press RETRIEVE VALUES, and then Push button "D" (PB-D) on remote 150' (RC-1) three times within six seconds.

Push button "A" (PB-A) on remote 150' one time to step to each successive parameter, as set forth in the following table:

| Configuration Step | Flow Guard Value | Lamp Light Indication |
|---|---|---|
| 1 - Leak test cycle time | 1-100 minutes | Leak Guard |
| 2 - Leak test decay time | 1-100 minutes | Leak Fault |
| 3 - Manual override time | 1-10 hours | Flow Guard |
| 4 - Low flow rate time | 1-20 seconds | Flow Fault |
| 5 - Leak test fail count | 1-10 counts | Leak Gd. and Flow Gd. |
| 6 - Low flow fail count | 1-10 counts | Flow Ft. and Leak Gd. |
| 7 - Surge flow time | 1-10 seconds | Flow Gd. and Flow Ft. |
| 8 - Surge window time | 1-20 seconds | Flow Gd. and Leak Ft. |
| 9 - Restore default | Fixed, not used | All lamp lights on. |

To exit Configuration Mode, push button "D" (PB-D) at any time during programming.

The following table relates to functions and default settings:

| Definition of Function | Default |
|---|---|
| 1 - Time after each demand when a leak test begins | 20 mins. |
| 2 - Time allowed for a pressure drop to indicate leak | 5 mins. |
| 3 - Time that demand timer has no effect on fault trip | 2 hours |
| 4 - Time window for low pressure to indicate low demand | 8 secs. |
| 5 - Number of times allowed for a failed leak test | 3 counts |
| 6 - Number of times allowed for a low demand | 3 counts |
| 7 - Time for a demand flow signal to be established | 2 secs. |
| 8 - Time allowed for the demand flow signal to verify | 10 secs. |
| 9 - Pressing the panel reset 136' restores all default settings. | |

For the customer to change a value on a selected unit 100', the following is carried out with the remote unit 150' (RC-1) while he is or can get quickly yet conveniently positioned in view and reach of the control box face 121F:

1. The button "D" is pushed three times within six seconds to enter the program mode.
2. The button "A" is pushed to select the function, one push for each successive function, verified, for example, by the display of the appropriate panel lamps, as above.
3. The flow guard knob 126' is adjusted to the desired value while that function is actively engaged, and the selected value is confirmed with a setup unit at a help desk.
4. The new value is sent to the control logic by pushing the reset button 136' on the control panel front 121F. The lamp(s) which indicate(s) which function is having its value changed, as noted above, light(s) for two seconds, indicating that change has been made.
5. This is repeated for any other adjustable function.
6. The Program Mode is exited by pushing the button "D" on the remote control 150' once. The value(s) is(are) loaded, and the apparatus 100' returns to normal operation, operating under the changed values.

Figure 7:
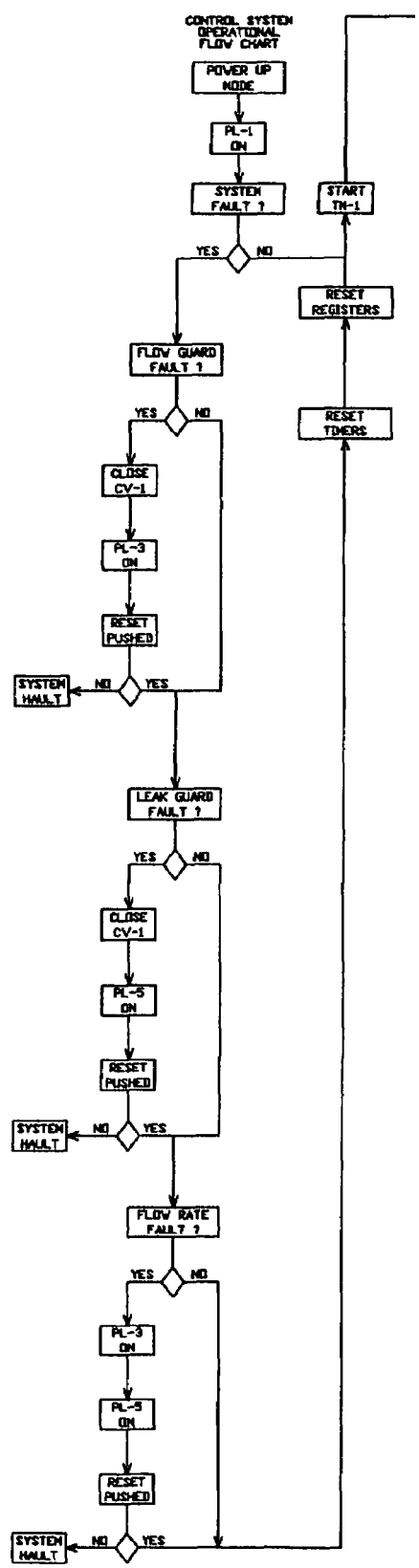
FIG. 7 shows a flow chart illustrating operation of the invention with the apparatus and device of FIGS. 3-6.
Figure 7:
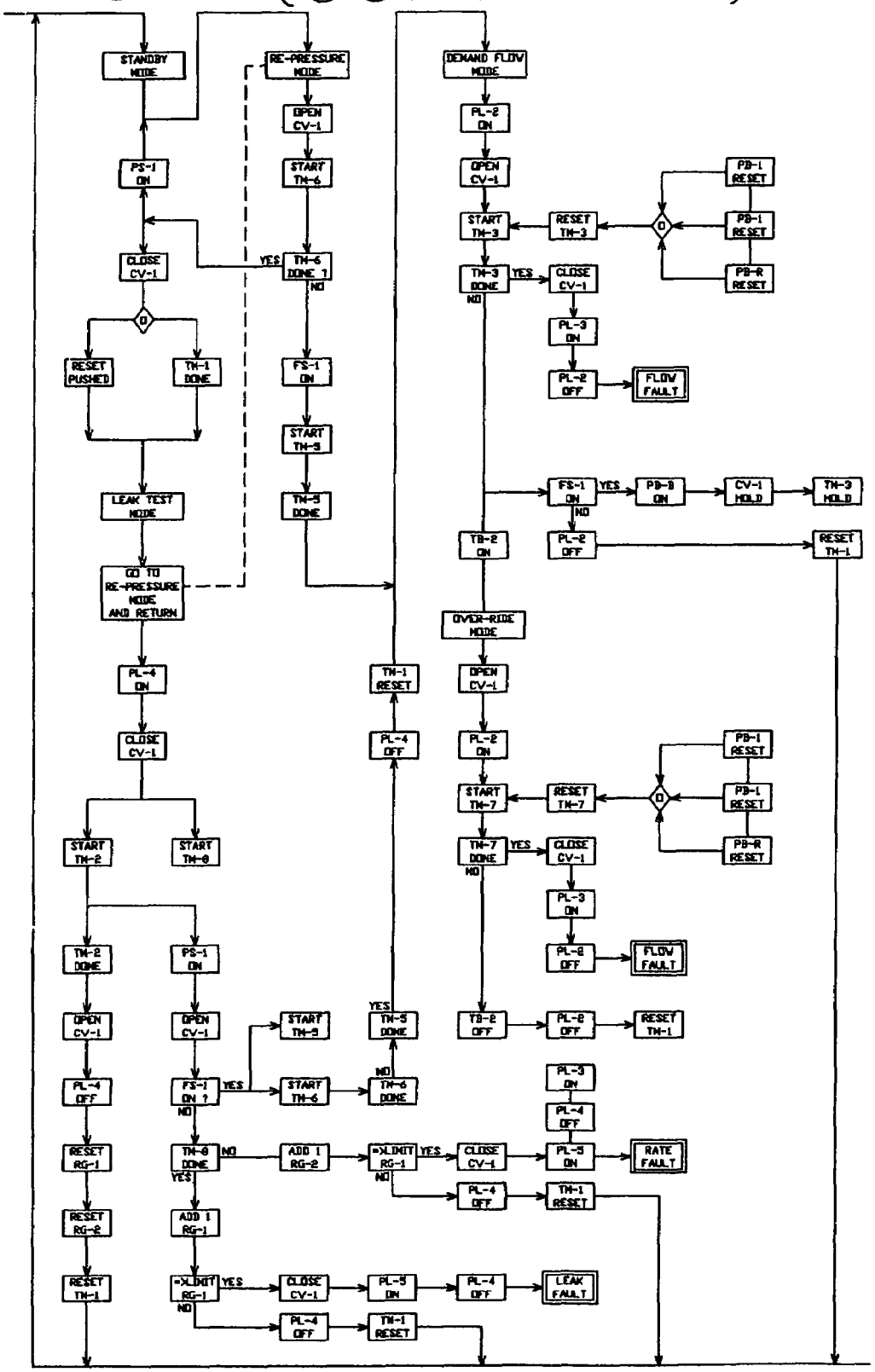
Figure 7:
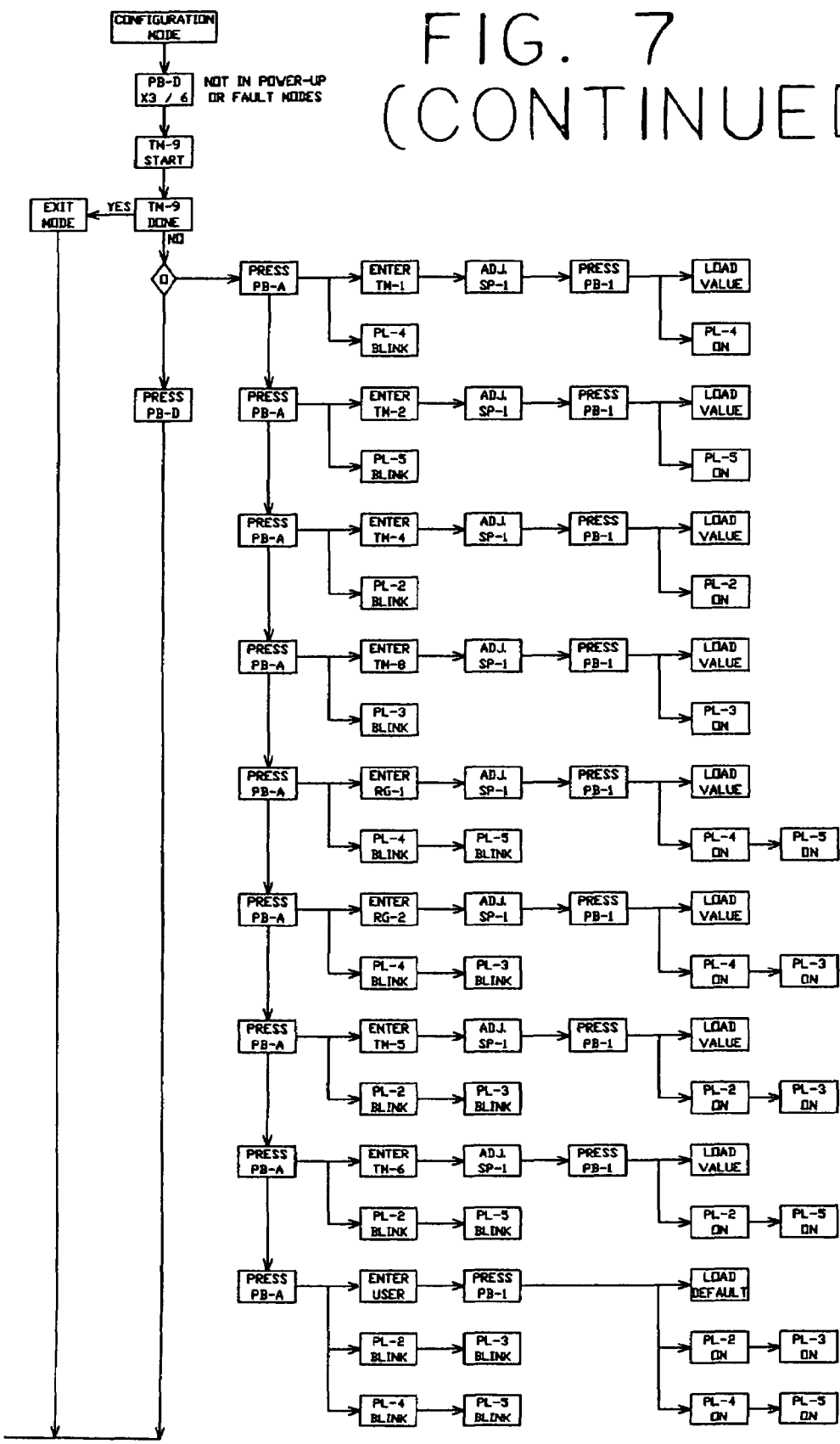
Figure 8:
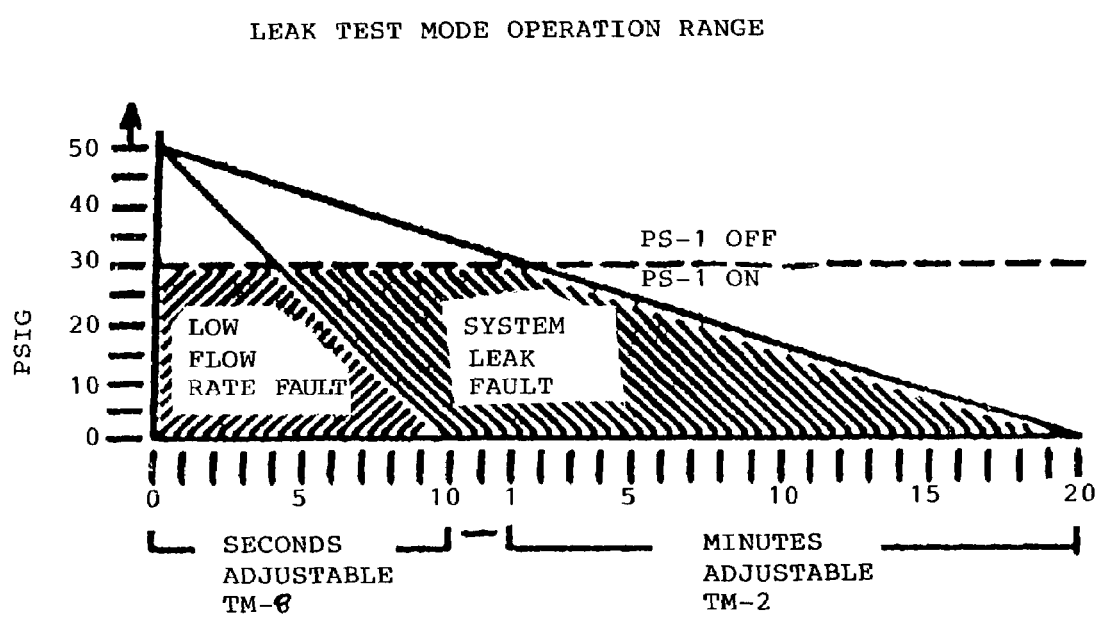
FIG. 8 shows a sample pressure decay rate range of adjustment.

Thus, generally in accordance with that set forth above, operation of the invention, advantageously with the apparatus 100' of FIGS. 3-6, can be carried out according to the flow chart of FIG. 7. A sample pressure decay function is shown in FIG. 8.

And so, the unit 100, 100' can monitor an entire fluid supply system from one point. There are no remote sensors or remotely positioned batteries (save that of the remote control unit 150') to replace, which can otherwise be a trying experience. The unit 100, 100' can operate on standard household power and can be provided with "fail safe" security, i.e., water can be shut off automatically by default, for example, in the event of a power outage, most expressly the unit 101'. If water is needed while the power is off, the built-in by-pass valve 106, 106' can be opened for this, and it is closed again after the power is on. The invention conserves water, and saves the owner from the costly problems of dripping faucets and forgotten running taps by using its applied control logic for all normal exits as well as system faults and failures.

Other features may be provided. For example, a screen may be provided on the remote control 150' by which remote program steps and functions can be displayed in an alphanumeric or character format, thus avoiding interpretation of indicator panel lamps and the need to program the apparatus 100' by the operator with the remote control 150' directly in front of the display panel 121F. To more fully facilitate this, a dial or other suitable contrivance such as a keyboard or roller control may be provided on the remote control unit in lieu of the dial 126'. As well, a screen may be provided on the control box 121' that indicates in alphanumeric or character format the values and other parameters under which the apparatus 100' is operating. Then, too, function of the remote 150' may be built in to the housing 101', say, with the control box 121', with or without a separate remote unit 150' being provided with the apparatus 100'.

Accordingly, the invention, especially as embodied to include the apparatus 100', can have the following beneficial features related to the apparatus 100' itself:

No batteries.
No backup power required.
Use of 120V AC.
Fail safe design.
No wiring to remote or external sensors.
No remote or external sensors.
Easy installation.
Compact design.
Fully assembled for installation.
Installation to existing water line.
Attractive enclosure and appearance.
Remote(s) 150' included for consumer use.
No difficult programming required by user.

The apparatus 100' can automatically do the following:

Detect the smallest drip or leak, and shut the water off.
Turn off the water if accidentally left on.
Turn off the water when the user leave the premises.
Turn on the water when the user returns.
Protect the home or other building structure even when the electrical power has failed.
Automatically reset and get back to the job after the end of a power outage.

CONCLUSION TO THE INVENTION

The present invention is thus provided. Various feature(s), part(s), step(s), subcombination(s) and/or combination(s) can be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. A leak detection apparatus for detecting and controlling a leak in a pressurized piping system, which comprises:
   control logic;
   both of one and only one flow detector in communication with said logic, and one and only one pressure detector in communication with said logic; and
   a control valve in communication with said logic;
   wherein at least one of the following additional features is also provided:
   the control logic, both of one and only one flow detector and one and only one pressure detector, and the control valve are in close proximity to one another; and
   the control valve has a baseline condition of being shut off.

2. The apparatus of claim 1, wherein a remote control device is provided, which can remotely interact with the control logic, and allows for remote reset and override capability as well as a leak test on demand at any time from a remote or proximate location to insure proper operation.

3. The apparatus of claim 1, wherein the additional feature of the control valve having a baseline condition of being shut off is present.

4. The apparatus of claim 3, wherein a remote control device is provided, which can remotely interact with the control logic.

5. In combination, the apparatus of claim 3 and a pressurizable piping system to which the apparatus is connected in fluid communication with the system for delivery of the fluid.

6. The combination of claim 5, wherein the fluid is water; the piping system is brachiated; and a single apparatus is connected.

7. The apparatus of claim 1, wherein the additional feature is present of the control logic, both of one and only one flow detector and one and only one pressure detector, and the control valve being in close proximity to one another.

8. The apparatus of claim 7, wherein a remote control device is provided, which can remotely interact with the control logic.

9. In combination, the apparatus of claim 7 and a pressurizable piping system to which the apparatus is connected in fluid communication with the system for delivery of the fluid.

10. The combination of claim 9, wherein the fluid is water; the piping system is brachiated; and a single apparatus is connected.

11. The apparatus of claim 1, wherein both additional features of
    the control logic, both of one and only one flow detector and one and only one pressure detector, and the control valve being in close proximity to one another; and
    the control valve having a baseline condition of being shut off
are present; and wherein the apparatus can generally discriminate between controlled and uncontrolled pressure decay at very low flow rates.

12. The apparatus of claim 11, wherein a remote control device is provided, which can remotely interact with the with the control logic.

13. In combination, the apparatus of claim 11 and a pressurizable piping system to which the apparatus is connected in fluid communication with the system for delivery of the fluid.

14. The combination of claim 13, wherein the fluid is water; the piping system is brachiated: a single apparatus is connected; and the controlled pressure decay at very low flow rates is represented by replenishment in a refrigerator's ice maker, and the uncontrolled pressure decay at very low flow rates is represented by an unwanted leak.

15. In combination, the apparatus of claim 1 and a pressurizable piping system to which the apparatus is connected in fluid communication with the system for delivery of the fluid.

16. The combination of claim 15, wherein the fluid is water; the piping system is brachiated; and a single apparatus is connected.

17. A leak detection apparatus for detecting and controlling a leak in a pressurized piping system for water, which comprises, in close proximity to one another the following:
    control logic;
    both of:
      one and only one flow detector in communication with the control logic, which can be set to detect minimal water flow; and
      one and only one pressure detector in communication with the control logic, which can be monitored in a pressure decay test initiated by the control logic; and
    a control valve in communication with the control logic, which has a baseline condition of being off.

18. The apparatus of claim 17, which further comprises the following features:
    a user demand set to establish a maximum user demand time period;
    a fault indicator, which can be activated through signals from the control logic whenever a demand flow has exceeded a preset value or when a low rate count exceeds a set value to indicate why the apparatus has stopped flow of the water;
    a leak-detected indicator, which is activated when a leak test has failed or when a low rate count exceeds a set value to indicate why the apparatus has stopped flow of the water;
    a reset to restart the apparatus after shut down;
    a power-on indicator to indicate main control power on;
    a demand indicator, which is activated when the water is flowing; and
    a leak-testing indicator, which is activated while a leak test is being conducted.

19. The apparatus of claim 18, which further comprises the following:
    a control panel or box, which contains the following:
      the control logic, said both flow detector and pressure detector, and said control valve; and
      manual valves, as follows:
        a first valve, which is normally closed during operation, but can be opened for by-pass mode; and
        second and third valves, which are mounted on test line sections of the apparatus; and
    a remote control;
    and wherein:
    the user demand set includes a dial;
    the fault indicator, the leak-detected indicator, the power-on indicator, the demand indicator, and the leak-testing indicator include lights; and
    the reset includes a button.

20. The apparatus of claim 17, which further comprises the following:
    A. User inputs associated with the control logic, which include the following inputs controllable from a panel front:
       a system reset button; and
       a flow guard knob, which is a variable resistor type with control in minutes; and
       a wireless remote, which also can provide for user input;

B. User monitoring outputs located on the panel front and associated with the control logic, which include the following:
  a power-on lamp;
  a flow guard lamp;
  a flow fault lamp;
  a leak guard lamp; and
  a leak fault lamp; and
  user monitoring outputs located on the remote;
C. Standard inputs with respect to terminal strip wiring associated with a control box and the control logic, which include the following:
  for power, 120-V AC, from a cord;
  for the flow detector, a flow switch with normally open contact, which closes contact at approximately 0.21 gpm on increasing flow; and
  for the pressure detector, a pressure switch with normally closed contact, which opens contacts at approximately a 30-psig value on increasing pressure;
D. Standard output with respect to terminal strip wiring associated with the control box and control logic, which includes that to the control valve, 120-V AC 60-Hz, normally closed, full port;
E. Auxiliary inputs with respect to optional terminal strip wiring associated with the control box and control logic, which include the following:
  an external reset switch, which allows the user to reset a fault condition from a hardwired switch away from the control panel, and which has normally open contact with multiple switches able to be wired in parallel; and
  a flow guard override switch, which can indicate that a long-demand item needs water, normally open contact input;
F. Auxiliary outputs with respect to optional terminal strip wiring associated with the control box and control logic, which include the following:
  a fault lamp, a security system link normally open, closed on fault, which requires power be supplied to the apparatus for operation;
  a power lamp, 5-V DC, which is for service; and
  a ground for shielding;
G. Non-stored configuration settings with respect to terminal strip wiring associated with the control box and control logic, which include that from a flow guard timer set by the flow guard knob, which is maximum continuous time that water can run, except when a flow guard override signal has been received, which is a user-adjustable factor;
H. Stored configuration settings, electrically erasable permanent read only memory (EEPROM), with respect to terminal strip wiring, associated with the control box and control logic, which include the following:
  a leak test cycle timer, which times intervals between leak tests, and which can be programmably adjustable from the remote to a 1-minute to 100-minute value;
  a leak test decay timer, which times duration of the leak test, and which can be programmably adjustable from the remote to a 1-minute to 100-minute value;
  a flow guard override timer, which is an auxiliary input that times maximum duration water can run when the flow guard timer is being overridden, and which can be programmably adjustable from the remote to a 1-hour to 10-hour value;
  a surge flow timer, which can time minimum time allowed to establish a flow signal, which is the time allowed to establish a verified flow where a flow signal pulse from the flow switch is expected when the piping system repressurizes and for which the flow switch remains activated for the adjustable time period in order for a logical one-flow signal to be generated, and which can be programmably adjustable from the remote to a 1-second to 10-second value;
  a surge window timer, which controls time allowed for flow verification, which is maximum time allowed for a verified flow signal to be established and begin the next programmable step, and which can be programmably adjustable from the remote to a 1-second to 10-second value;
  a low flow rate timer, which determines possible low flow represented by drip-watering of plants or making ice in a freezer versus a leak, which is a time window beginning a leak test when a low pressure condition is considered a low flow instead of a leak, and which can be programmably adjustable from the remote to a 1-second to 20-second value; and
  a configuration timer, which is for limiting time allotted to complete programming of the apparatus;
I. Limits associated with the control logic, which include the following:
  a leak failure limit, which is the number of leak test failures that it takes for the apparatus to go to a leak fault status indicated by the leak fault lamp, and which can be programmably adjustable from the remote to a 1-count to 10-count value; and
  a low flow failure limit, which is the number of low flow failures that it takes for the apparatus to go to a flow fault status indicated by the flow fault lamp, and which can be programmably adjustable from the remote to a 1-count to 10-count value.

21. The apparatus of claim 20 having a further feature, which includes a last known state program that, upon reset or restarting of the apparatus, returns the control logic to the last step at which it had been functioning previously, in which the state is updated in EEPROM when a fault occurs or is cleared.

* * * * *